US010784043B2

United States Patent
Han et al.

(10) Patent No.: US 10,784,043 B2
(45) Date of Patent: Sep. 22, 2020

(54) WIRELESS POWER TRANSMISSION DEVICE, WIRELESS POWER RECEPTION DEVICE, AND WIRELESS CHARGING SYSTEM

(71) Applicant: LG ELECTRONICS INC., Seoul (KR)

(72) Inventors: Kiwon Han, Seoul (KR); Donghyun Seo, Seoul (KR); Jun Park, Seoul (KR); Wonji Hwang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 44 days.

(21) Appl. No.: 16/340,644

(22) PCT Filed: Dec. 22, 2016

(86) PCT No.: PCT/KR2016/015111
§ 371 (c)(1),
(2) Date: Apr. 9, 2019

(87) PCT Pub. No.: WO2018/070614
PCT Pub. Date: Apr. 19, 2018

(65) Prior Publication Data
US 2020/0051737 A1 Feb. 13, 2020

(30) Foreign Application Priority Data

Oct. 10, 2016 (KR) .................... 10-2016-0130719

(51) Int. Cl.
*H01F 38/14* (2006.01)
*H02J 50/10* (2016.01)
(Continued)

(52) U.S. Cl.
CPC .............. *H01F 38/14* (2013.01); *H02J 7/025* (2013.01); *H02J 50/12* (2016.02)

(58) Field of Classification Search
CPC . H01F 38/14; H02J 7/025; H02J 50/10; H02J 50/12
(Continued)

(56) References Cited

U.S. PATENT DOCUMENTS

2020/0051736 A1* 2/2020 Yu ........................... H01F 38/14

FOREIGN PATENT DOCUMENTS

| JP | 2002246248 | 8/2002 |
| JP | 2010239848 | 10/2010 |

(Continued)

OTHER PUBLICATIONS

Korean Intellectual Property Office Application No. 10-2016-0130719, Office Action dated Sep. 15, 2017, 5 pages.
(Continued)

*Primary Examiner* — William Hernandez
(74) *Attorney, Agent, or Firm* — Lee Hong Degerman Kang & Waimey

(57) ABSTRACT

The present invention relates to a wireless power transmission device formed so as to wirelessly transmit power to a wireless power reception device, wherein the wireless power transmission device comprises: a first coil formed so as to transform a current into a magnetic field; and a first metal member formed so as to cover at least a portion of the first coil, and, in the present invention, the first metal member changes an emission direction of a magnetic field formed in the first coil so as to allow the power to reach the wireless power reception device which is positioned on a side surface of the wireless power transmission device.

12 Claims, 9 Drawing Sheets

(51) Int. Cl.
*H02J 50/12* (2016.01)
*H02J 7/02* (2016.01)
(58) Field of Classification Search
USPC .......................................... 307/104
See application file for complete search history.

(56) References Cited

FOREIGN PATENT DOCUMENTS

| | | |
|---|---|---|
| JP | 5746049 | 7/2015 |
| KR | 20140129930 | 11/2014 |
| KR | 20160016551 | 2/2016 |
| KR | 20160039778 | 4/2016 |
| WO | 2012086280 | 6/2012 |
| WO | 2015125295 | 8/2015 |

OTHER PUBLICATIONS

Korean Intellectual Property Office Application No. 10-2016-0130719, Notice of Allowance dated Mar. 27, 2018, 2 pages.
PCT International Application No. PCT/KR2016/015111, International Search Report dated Jun. 30, 2017, 2 pages.

* cited by examiner

WIRELESS POWER TRANSMISSION DEVICE, WIRELESS POWER RECEPTION DEVICE, AND WIRELESS CHARGING SYSTEM

CROSS-REFERENCE TO RELATED APPLICATIONS

This application is the National Stage filing under 35 U.S.C. 371 of International Application No. PCT/KR2016/015111, filed on Dec. 22, 2016, which claims the benefit of earlier filing date and right of priority to Korean Application No. 10-2016-0130719, filed on Oct. 10, 2016, the contents of which are all hereby incorporated by reference herein in their entirety.

TECHNICAL FIELD

The present invention relates to a method of supplying power to a wireless power reception device located at a side of a wireless power transmission device wirelessly transmitting power.

BACKGROUND ART

Instead of a method of supplying electrical energy to wireless power reception devices (receiving apparatuses) in a wired manner, a method of wirelessly supplying electric energy without contact has been used in recent years. A wireless power reception device that receives energy wirelessly may be driven directly by the received wireless power, or may be driven by power which is charged in a battery using the received wireless power.

Wireless charging is already common in our lives. For example, a wireless charging method using electromagnetic induction is commercially utilized in electric toothbrushes, wireless coffee ports, and the like.

On the other hand, since a transmission device (or transmitting apparatus) supplies electric power (or power) wirelessly using a magnetic field, there is a problem in that power cannot be efficiently supplied to a reception device located in a direction where density of the magnetic field is low. Accordingly, when a reception device is not overlaid on the transmission device, the transmission device cannot efficiently supply power even when the reception device is located in the vicinity.

DETAILED DESCRIPTION OF THE DISCLOSURE

One aspect of the present invention is to provide a structure of a transmitting coil for wirelessly supplying power to a reception device located at a side of a transmission device.

Another aspect of the present invention is to provide a structure for improving efficiency of power supplied to a reception device located at a side of a transmission device.

To achieve the aforementioned aspects and other advantages of the present invention, there is provided a wireless power transmission device configured to wirelessly transmit power to a wireless power reception device, the transmission device including a first coil configured to convert a current into a magnetic field, and a first metal member formed to cover at least a portion of the first coil, wherein the first metal member changes an emission direction of a magnetic field formed in the first coil so that power reaches the wireless power receiving device located at a side surface of the wireless power transmission device.

In one embodiment, the first metal member may change the emission direction of the magnetic field from a direction perpendicular to one surface of the first coil into a direction horizontal to the one surface.

In one embodiment, the first metal member may be formed to cover at least half of one surface of the first coil so that the magnetic field formed in the first coil is concentrated.

In one embodiment, the first metal member may be disposed to be close to a position where the wireless power reception device is located so that power is transmitted to the wireless power reception device.

In one embodiment, the transmission device may further include a second metal member forming an inner space to enclose the first coil and the first metal member and made of a metallic material to prevent emission of the magnetic field to outside.

In one embodiment, the second metal member may form an opening area such that at least part of another surface of the first coil, facing one surface of the first coil covered by the first metal member, is exposed therethrough.

In one embodiment, the transmission device may further include a second coil disposed to overlap the first coil exposed through the opening area.

In one embodiment, the second coil may be exposed to the outside through the opening area.

In one embodiment, the second coil may be electrically connected to a capacitor to match a harmonic frequency of a fundamental frequency.

In one embodiment, the second coil may have one side electrically connected to the second metal member and another side connected to the second metal member, so as to match a harmonic frequency of a fundamental frequency.

Effects of the Disclosure

According to a transmission device of the present invention as described above, a direction of a magnetic field emitted from a coil is changed from a perpendicular direction to a horizontal direction with respect to a coil by using a metallic shielding member. Therefore, a user can perform charging wirelessly even if the transmission device and a receiving device are not perpendicularly stacked with each other.

Further, according to a transmission device of the present invention, power efficiency can be improved through a first coil that emits a magnetic field having a fundamental frequency and a second coil that emits a magnetic field having a harmonic of the fundamental frequency.

Further, according to a transmission device of the present invention, a magnetic field can be concentrated and emitted through a metal member, whereby a recognition distance of wireless charging can be improved.

BEST MODE FOR CARRYING OUT PREFERRED EMBODIMENTS

Figure 1:
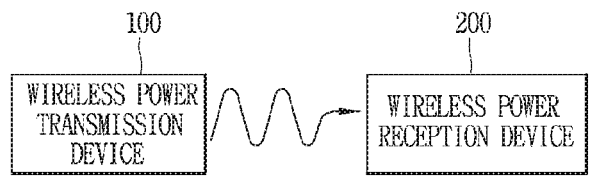
FIG. 1 is an exemplary view conceptually illustrating a wireless power transmission device and a wireless power reception device according to embodiments of the present invention.

The technology disclosed herein is applied to wireless power transmission. However, the technology disclosed herein is not limited thereto, and may be applicable even to all power transmission systems and methods, wireless charging circuits and methods, and other methods and apparatuses that utilize wirelessly transmitted power to which the technical idea of the technology can be applied.

It is noted that the technical terms used herein are used only to describe specific embodiments and are not intended to limit the invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In general, a suffix such as "module" and "unit" may be used to refer to elements or components. Use of such a suffix herein is merely intended to facilitate description of the specification, and the suffix itself is not intended to give any special meaning or function.

It will be understood that although the terms first, second, etc. may be used herein to describe various elements, these elements should not be limited by these terms. These terms are generally only used to distinguish one element from another. For example, without departing from the scope of the present invention, a first component may be referred to as a second component, and similarly, the second component may also be referred to as the first component.

Description will now be given in detail according to preferred embodiments disclosed herein, with reference to the accompanying drawings. For the sake of brief description with reference to the drawings, the same or equivalent components may be provided with the same or similar reference numbers, and description thereof will not be repeated.

In describing the present disclosure, if a detailed explanation for a related known function or construction is considered to unnecessarily divert the gist of the present disclosure, such explanation has been omitted but would be understood by those skilled in the art. It should be noted that the attached drawings are provided to facilitate understanding of the embodiments disclosed in this specification, and should not be construed as limiting the technical idea disclosed in this specification by the attached drawings.

Definition

Many-to-one communication: communicating between one transmitter (Tx) and many receivers (Rx)

Unidirectional communication: transmitting a required message only from a receiver to a transmitter Bidirectional communication: communication method allowing message transmission from a transmitter to a receiver and from a receiver to a transmitter, namely, in a bidirectional manner Here, the transmitter and the receiver indicate the same as a transmitting unit (transmitting apparatus or transmission device) and a receiving unit (receiving apparatus or reception device), respectively. Hereinafter, those terms may be used together.

Conceptual View of Wireless Power Transmitter and Wireless Power Receiver

FIG. 1 is an exemplary view conceptually illustrating a wireless power transmission device and a wireless power reception device according to embodiments of the present invention.

Referring to FIG. 1, the wireless power transmitter 100 may be a power transfer apparatus or device configured to transfer power required for the wireless power receiver 200 in a wireless manner.

Furthermore, the wireless power transmitter 100 may be a wireless charging apparatus or device configured to charge a battery of the wireless power receiver 200 by transferring power in a wireless manner.

Additionally, the wireless power transmitter 100 may be implemented with various forms of apparatuses or devices transferring power to the wireless power receiver 200 requiring power in a contactless state.

The wireless power receiver 200 is a device that is operable by receiving power from the wireless power transmitter 100 in a wireless manner. Also, the wireless power receiver 200 may charge a battery using the received wireless power.

On the other hand, a wireless power reception device or receiver for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The wireless power receiver or reception device 200, as described later, may be a mobile communication terminal (for example, a portable phone, a cellular phone, and a tablet and the like) or a multimedia device.

On the other hand, the wireless power transmitter or transmission device 100 may transfer power in a wireless manner without mutual contact to the wireless power receiver 200 using one or more wireless power transfer methods. In other words, the wireless power transmitter 100 may transfer power using at least one of an inductive coupling method based on a magnetic induction phenomenon by a wireless power signal and a magnetic resonance coupling method based on an electromagnetic resonance phenomenon by a wireless power signal at a specific frequency.

Wireless power transfer in the inductive coupling method is a technology transferring power in a wireless manner using a primary coil and a secondary coil, and refers to transmission of power by inducing a current from a coil to another coil through a changing magnetic field by a magnetic induction phenomenon.

Wireless power transfer in the inductive coupling method refers to a technology in which the wireless power receiver 200 generates resonance by a wireless power signal transmitted from the wireless power transmitter 100 to transfer power from the wireless power transmitter 100 to the wireless power receiver 200 by the resonance phenomenon.

Hereinafter, the wireless power transmitter 100 and wireless power receiver 200 according to the embodiments disclosed herein will be described in detail. In assigning reference numerals to the constituent elements in each of the following drawings, the same reference numerals will be used for the same constituent elements even though they are shown in a different drawing.

Figure 2A:
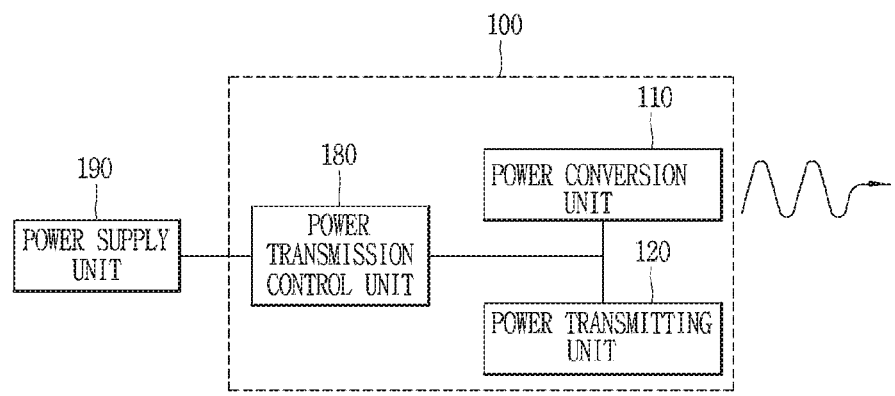
FIGS. 2A and 2B are block diagrams exemplarily illustrating configuration of a wireless power transmission device 100 and a wireless power reception device 200 that can be employed in the embodiments disclosed herein.
Figure 2B:
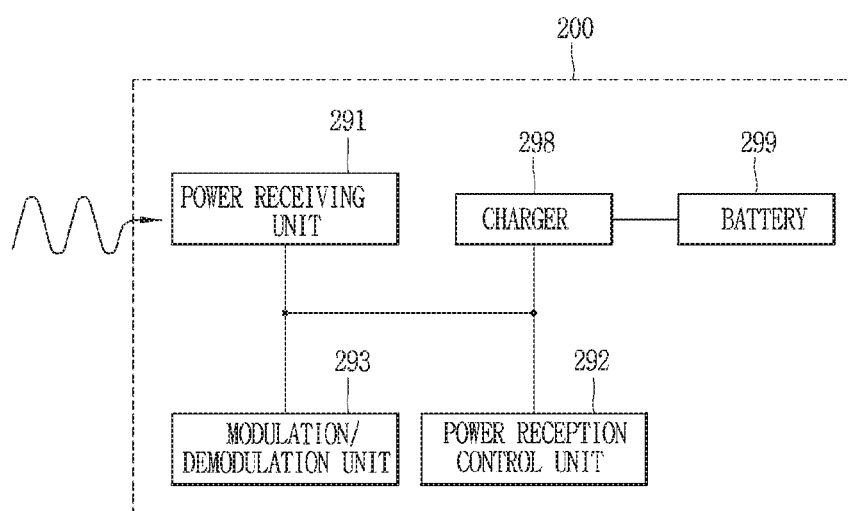

FIGS. 2A and 2B are block diagrams exemplarily illustrating configuration of a wireless power transmission device 100 and a wireless power reception device 200 that can be employed in the embodiments disclosed herein.

Wireless Power Transmission Device

Referring to FIG. 2A, the wireless power transmitter 100 may include a power transmission unit 110. The power transmission unit 110 may include a power conversion unit 111 and a power transmission control unit 112.

The power conversion unit 111 transfers power supplied from a transmission side power supply unit 190 to the wireless power receiver 200 by converting it into a wireless power signal. The wireless power signal transferred by the power conversion unit 111 is generated in the form of a magnetic field or electro-magnetic field having an oscillation characteristic. For this purpose, the power conversion unit 111 may be configured to include a coil for generating the wireless power signal.

The power conversion unit 111 may include a constituent element for generating a different type of wireless power signal according to each power transfer method. For example, the power conversion unit 111 may include a primary coil for forming a changing magnetic field to induce a current to a secondary coil of the wireless power receiver 200 according to an inductive coupling method. Furthermore, the power conversion unit 111 may include a coil (or antenna) for forming a magnetic field having a specific resonant frequency to generate resonance in the wireless power receiver 200 according to a resonance coupling method.

The power conversion unit 111 may also transfer power using at least one of the foregoing inductive coupling method and the resonance coupling method. The inductive coupling method is a method of generating an induction magnetic field to supply power to the wireless power reception device 200 using a magnetic field generated in the wireless power transmission device 100. The resonant coupling method is a method of supplying power to the wireless power reception device 200 using resonance of a magnetic field generated in the wireless power transmission device 100.

On the other hand, the power conversion unit 111 may further include a circuit for controlling the characteristics of a used frequency, an applied voltage, an applied current or the like to form the wireless power signal.

The power transmission control unit 112 controls each of the constituent elements included in the power transmission unit 110. The power transmission control unit 112 may be implemented to be integrated into another control unit (not shown) for controlling the wireless power transmitter 100.

On the other hand, an area (or region) to which the wireless power signal can be approached may be divided into two types. First, an active area denotes a region through which a wireless power signal transferring power to the wireless power receiver 200 is passed. Next, a semi-active area denotes an interest region in which the wireless power transmitter 100 can detect the existence of the wireless power receiver 200. Here, the power transmission control unit 112 may detect whether the wireless power receiver 200 is placed in the active area or detection area or removed from the area. Specifically, the power transmission control unit 112 may detect whether or not the wireless power receiver 200 is placed in the active area or detection area using a wireless power signal formed from the power conversion unit 111 or a sensor separately provided therein. For instance, the power transmission control unit 112 may detect the presence of the wireless power receiver 200 by monitoring whether or not the characteristic of power for forming the wireless power signal is changed because of affection by the wireless power receiver 200 existing in the detection area. However, the active area and detection area may vary according to a wireless power transfer method such as an inductive coupling method, a resonance coupling method, and the like.

The power transmission control unit 112 may perform a process of identifying the wireless power receiver 200 or determine whether to start wireless power transfer according to a result of detecting the existence of the wireless power receiver 200.

Furthermore, the power transmission control unit 112 may determine at least one characteristic of a frequency, a voltage, and a current of the power conversion unit 111 for forming the wireless power signal. The determination of the characteristic may be carried out by a condition at the side of the wireless power transmitter 100 or a condition at the side of the wireless power receiver 200.

The power transmission control unit 112 may receive a power control message from the wireless power reception device 200. The power transmission control unit 112 may determine at least one characteristic of a frequency, a voltage and a current of the power conversion unit 111 based on the received power control message, and additionally perform other control operations based on the power control message.

For example, the power transmission control unit 112 may determine at least one characteristic of a frequency, a voltage and a current used to generate the wireless power signal according to the power control message including at least one of rectified power amount information, charging state information and identification information in the wireless power receiver 200.

In addition, as another control operation using the power control message, the wireless power transmitter 100 may perform a typical control operation associated with wireless power transfer based on the power control message. For example, the wireless power transmitter 100 may receive information associated with the wireless power receiver 200 to be auditorily or visually output or receive information required for authentication between devices, through the power control message.

The power transmission control unit 112 may receive the power control message by using at least one of methods, for example, through a wireless power signal or in a manner of receiving user data.

In order to receive the power control message, the wireless power transmitter 100 may further include a power communications modulation/demodulation unit 113 electrically connected to the power conversion unit 111. The modulation/demodulation unit 113 may modulate a wireless power signal that has been modulated by the wireless power receiver 200 and use it to receive the power control message.

In addition, in some exemplary embodiments, the power transmission control unit 112 may acquire such power control message by receiving user data including the power control message through a communication element (not shown) included in the wireless power transmitter 100.

[For Supporting in-Band Two-Way Communication]

Under a wireless power transfer environment allowing for bi-directional communications according to the exemplary embodiments disclosed herein, the power transmission control unit 112 may transmit data to the wireless power receiver 200. The data transmitted by the power transmission control unit 100 may be transmitted to request the wireless power receiver 200 to send a power control message.

Wireless Power Receiver

Referring to FIG. 2B, the wireless power receiver 200 may include a power supply unit 290. The power supply unit 290 supplies power required for the operation of the wireless power receiver 200. The power supply unit 290 may include a power receiving unit 291 and a power reception control unit 292.

The power receiving unit 291 receives power transferred from the wireless power transmitter 100 in a wireless manner.

The power receiving unit 291 may include constituent elements required to receive the wireless power signal according to a wireless power transfer method. In addition, the power receiving unit 291 may receive power according to at least one wireless power transfer method, and in this case, the power receiving unit 291 may include constituent elements required for each method.

First, the power receiving unit 291 may include a coil for receiving a wireless power signal transferred in the form of a magnetic field or electromagnetic field having an oscillation characteristic.

For instance, as a constituent element according to an inductive coupling method, the power receiving unit 291 may include a secondary coil to which a current is induced by a changing magnetic field. The power receiving unit 291, as a constituent element according to a resonance coupling method, may also include a coil and a resonant circuit in which a resonance phenomenon is generated by a magnetic field having a specific resonant frequency.

However, when the power receiving unit 291 receives power according to at least one wireless power transfer method, the power receiving unit 291 may be implemented to receive power by using one coil, or implemented to receive power by using a coil formed differently according to each power transfer method.

On the other hand, the power receiving unit 291 may further include a rectifier and a regulator to convert the wireless power signal into a direct current (DC current). Furthermore, the power receiving unit 291 may further include a circuit for protecting overvoltage or overcurrent from being generated by the received power signal.

The power reception control unit 292 may control each constituent element included in the power supply unit 290.

Specifically, the power reception control unit 292 may transfer a power control message to the wireless power transmitter 100. The power control message may instruct the wireless power transmitter 100 to initiate or terminate transmission of the wireless power signal. Also, the power control message may instruct the wireless power transmitter 100 to control the characteristic of the wireless power signal.

The power transmission control unit 292 may receive the power control message by using at least one of methods, for example, through a wireless power signal or in a manner of receiving user data.

In order to transmit the power control message, the wireless power receiver 200 may further include a power communications modulation/demodulation unit 293 electrically connected to the power receiving unit 291. Similar to the case of the wireless power transmitter 100, the modulation/demodulation unit 293 may use the wireless power signal to transmit the power control message. The modulation/demodulation unit 293 may be used as a means for controlling a current and/or voltage flowing through the power conversion unit 111 of the wireless power transmitter 100. Hereinafter, a method for allowing the power communications modulation/demodulation units 113 and 293 of the wireless power transmitter 100 and the wireless power receiver 200, respectively, to be used to transmit and receive a power control message through a wireless power signal will be described.

The wireless power signal generated by the power conversion unit 111 is received by the power receiving unit 291. At this time, the power reception control unit 292 controls the modulation/demodulation unit 293 of the wireless power reception device 200 to modulate the wireless power signal. For instance, the power reception control unit 292 may perform a modulation process such that a power amount received from the wireless power signal is varied by changing reactance of the power communications modulation/demodulation unit 293 connected to the power receiving unit 291. The change of the power amount received from the wireless power signal results in the change of a current and/or voltage of the power conversion unit 111 for generating the wireless power signal. At this time, the modulation/demodulation unit 113 of the wireless power transmitter 100 may detect the change of the current and/or voltage to perform a demodulation process.

In other words, the power reception control unit 292 may generate a packet including a power control message intended to be transferred to the wireless power transmitter 100 and modulate the wireless power signal to include the packet, and the power transmission control unit 112 may decode the packet based on the demodulation result, thereby acquiring the power control message included in the packet.

In addition, in some exemplary embodiments, the power reception control unit 292 may transmit the power control message to the wireless power transmitter 100 by transmitting user data including the power control message through a communication means (not shown) included in the wireless power receiver 200.

[For Supporting in-Band Two-Way Communication]

In addition, in a wireless power transmission environment capable of bidirectional communication according to the embodiments disclosed herein, the power reception control unit 292 may receive data transmitted from the wireless power transmission device 100. The data transmitted from the wireless power transmission device 100 may be transmitted to request for transmission of a power control message.

In addition, the power supply unit 290 may further include a charger 298 and a battery 299.

The wireless power receiver 200 receiving power for operation from the power supply unit 290 may be operated by power transferred from the wireless power transmitter 100, or operated by charging the battery 299 using the transferred power and then receiving the charged power. At this time, the power reception control unit 292 may control the charger 298 to perform charging using the transferred power.

Figure 3:
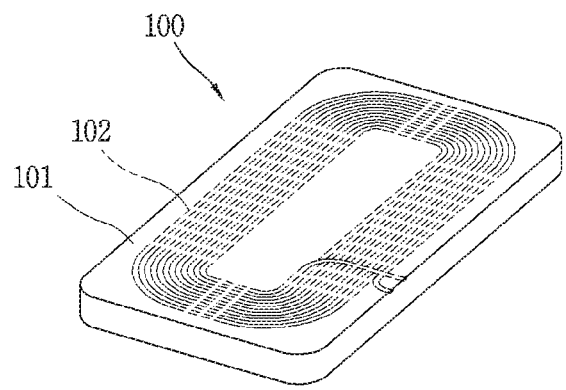
FIG. 3 is a conceptual view illustrating the related art wireless power transmission device.

Hereinafter, description will be given of a wireless power transmitter or transmission device and a wireless power receiver or reception device including at least one of those components described with reference to FIGS. 1 to 2B. FIG. 3 is a conceptual view illustrating the related art wireless power transmission device.

Referring to FIG. 3, the related art wireless power transmission device or transmitter 100 may include a main body 101 having an inner space, a coil 102 disposed in the inner space, and a charging pad 103 overlaid on the coil 102.

The main body 101 may have an inner space in which the coil 102 is disposed. In addition, the main body 101 may be made of a material that does not disturb a wireless power signal generated in the coil 102 disposed in the inner space. For example, the main body 101 may be made of a plastic material, a rubber material, or the like.

The coil 102 may convert a current into a magnetic field. The coil 102 may be decided in shape according to standard specification or product characteristics. For example, the coil 102 may have a shape conforming to the WPC specification. As another example, the coil 102 may have a form capable of supplying regulated power.

The charging pad 103 may be disposed on a front surface of the main body 101 and may be formed so that the wireless power reception device 200 can be mounted (or placed). The charging pad 103 may also be disposed on the coil 102 in an overlapping manner to transmit a wireless power signal and/or a power transmission message to the wireless power receiving device 200 placed on the charging pad 103. The user can perform charging by placing the wireless power reception device 200 on the charging pad 103.

Figure 4:
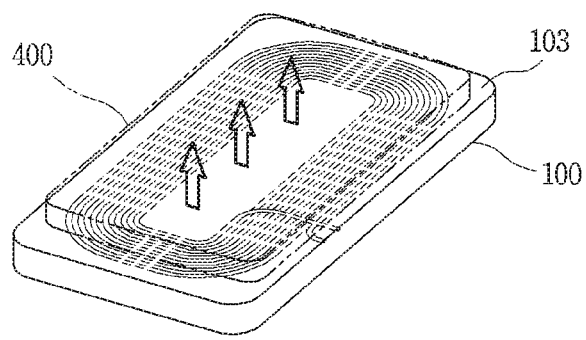
FIG. 4 is a conceptual view illustrating an area in which a power supply is allowed in a wireless power transmission device.

On the other hand, in the wireless power transmission device and the wireless power reception device each including the aforementioned components, the charging area in which the wireless power transmission device can supply power to the wireless power reception device may be limited. FIG. 4 is a conceptual view illustrating an area in which a power supply is allowed in a wireless power transmission device.

The wireless power transmission device 100 may have a predetermined area which a wireless power signal can reach. More specifically, as described above with reference to FIG. 2A, the wireless power transmitter 100 may have an active area 400 where the wireless power signal can reach. On the other hand, the wireless power transmitter 100 may have a non-active area where the wireless power signal cannot reach.

The active area 400 may be located in a front direction facing a front surface of the main body 101 and may be a region within a predetermined distance from the charging pad 103. In other words, the active area 300 may be a region where magnetic flux density of a magnetic field generated in the coil is high enough to perform charging. Therefore, as illustrated in FIG. 4, the wireless power reception device 200 may receive a wireless power signal from the wireless power transmission device 100 when the wireless power reception device 200 is mounted on the charging pad 103 of the wireless power transmission device 100.

The non-active area is an area where the wireless power signal cannot reach, which indicates the remaining area except for the active area 400. In other words, this non-active area refers to a region where the magnetic flux density of the magnetic field generated in the coil 102 is too low to perform charging. Therefore, the wireless power reception device 200 does not receive the wireless power signal from the wireless power transmission device 100 when the wireless power reception device 200 is positioned at a side of the main body 101, other than the front of the main body 101.

Therefore, in order to place the wireless power reception device 200 on the active area at any time, the related art wireless power transmission device 100 must have the charging pad on the front surface. Further, since the wireless power reception device 200 must always overlap the charging pad when charging the wireless power reception device 200, there is inconvenience that the charging pad cannot be used for other purposes while charging.

Figure 5:
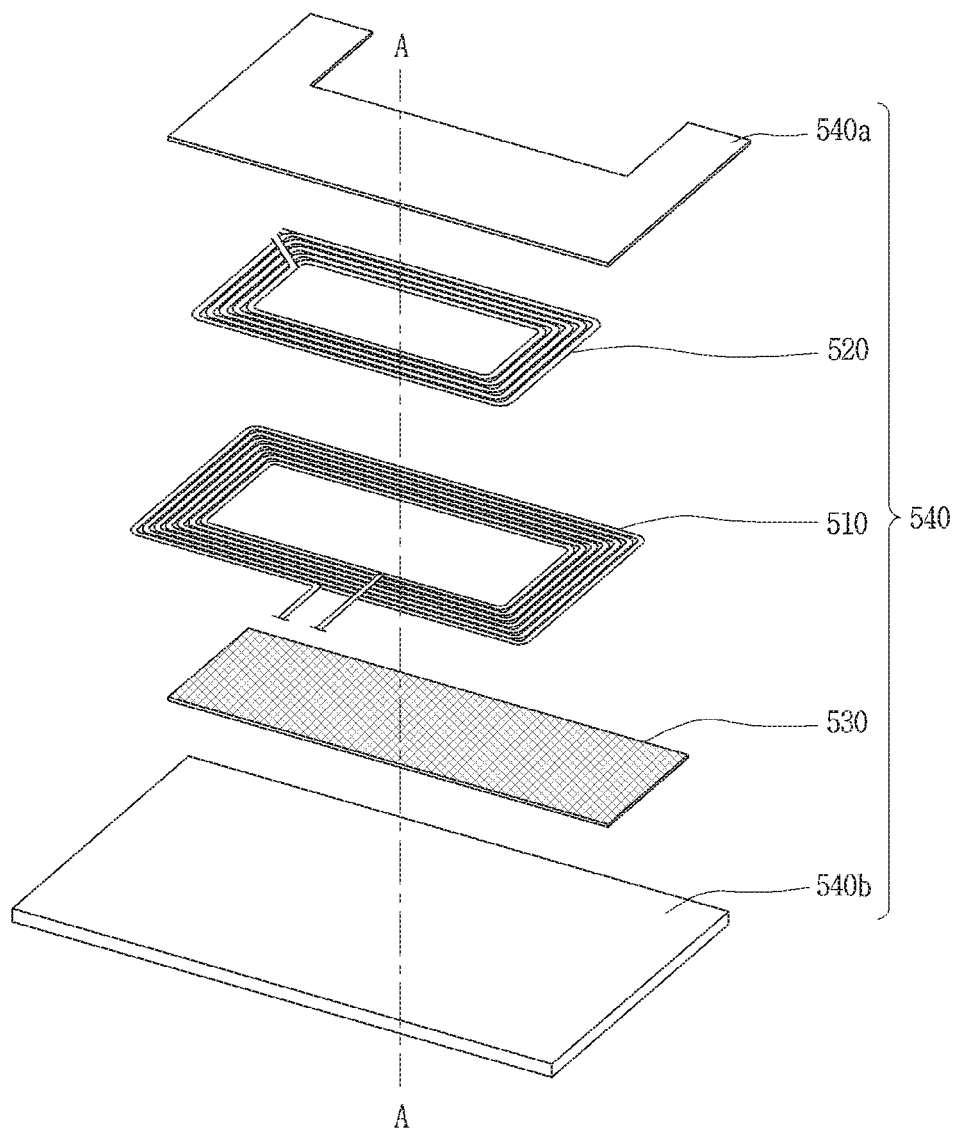
FIGS. 5 to 6B are views illustrating a coil structure of a wireless power transmission device 100 according to the present invention.

Accordingly, the present invention proposes a coil structure of the wireless power transmission device 100 for supplying power to the wireless power reception device 200 located at a side, other than on the front surface, of the wireless power transmission device 100. FIGS. 5 to 6B are views illustrating a coil structure of a wireless power transmission device 100 according to the present invention.

The wireless power transmission device 100 according to the present invention may include a power conversion unit, as illustrated in FIG. 5, to wirelessly transmit power to the wireless power reception device 200 located at a side of the wireless power transmission device 100. Referring to FIG. 5, the power conversion unit 111 of the wireless power transmission device 100 may include at least one of a first coil 510, a second coil 520, a first metal member 530, and a second metal member 540a, 540b.

The first coil 510 may convert a current into a magnetic field. A wireless power signal which is such a magnetic field may have a fundamental frequency of the wireless power transmission device 100. The fundamental frequency is a frequency at which the wireless power transmission device 100 operates to supply power to the wireless power reception device 200. Such a fundamental frequency may also be referred to as an operating frequency, a power transmission frequency, a carrier frequency, and a main frequency. The fundamental frequency is conforming to the standard specification, and may have 6.78 MHz.

The first coil 510 may be wound in a rectangular shape, and may have a shape including a hollow portion, as illustrated in FIG. 5. The present invention will be described with respect to a coil wound in a rectangular shape, but the shape of the coil is not limited thereto. The coil may alternatively be wound in various shapes such as circle, square, triangle, and the like if it can generate appropriate power.

The first metal member 530 may cover at least portion of one surface of the first coil 510. Specifically, the first metal member 530 may be formed to cover at least half of an entire area of the first coil 510. The first metal member 530 may be in contact with the first coil 510 through a contact tape.

The first metal member 530 may prevent the magnetic field generated in the first coil 510 from being emitted (discharged) to outside and simultaneously concentrate the magnetic field, which is not discharged to the outside, in an area where the first metal member 530 is located, so as to increase magnetic flux density of the magnetic field on the area covered with the first metal member 530. To this end, the first metal member 530 may be made of a material disturbing advancing or emission of the magnetic field, for example, a ferrite material, a polymer material, or a nano-crystal material.

In addition, the first metal member 530 may change an emission (discharge) direction of the magnetic field generated in the first coil 510, thereby changing the active region in which wireless charging can be performed. More specifically, the first metal member 530 changes the emission direction of the magnetic field generated in the first coil 510 from a direction perpendicular to one surface of the first coil 510 to a horizontal direction, so that the active area allowing wireless charging can be changed from the front surface of the main body 101 to a side of the main body. Accordingly, the first metal member 530 can transmit power to the wireless power reception device 200 located at the side of the main body.

In addition, similar to the second coil 520, the first metal member 530 may be positioned to be close to a position where the wireless power reception device 200 is to be arranged. Accordingly, the first metal member 530 can increase magnetic flux density of a position adjacent to the position where the wireless power reception device 200 is to be arranged. Therefore, the first metal member 530 can increase the magnetic flux density on the active area. The first metal member 530 can thus improve power efficiency and recognition distance of electric power to be transmitted to the wireless power reception device 200.

The second coil 520, like the first coil 510, may convert a current into a magnetic field. At this time, a wireless power signal which is a magnetic field generated in the second coil 520 may have a harmonic frequency of the fundamental frequency. The harmonic frequency refers to a frequency that corresponds to an integral multiple of the fundamental frequency. Thus, the second coil 520 can generate a wireless power signal having the harmonic frequency, thereby improving an amount of electric power that the wireless power transmission device 100 transmits to the wireless power reception device 200. As a result, the second coil 520 can improve power efficiency of the wireless power transmission device 100.

The second coil 520 may be arranged to overlap the first coil 510. In addition, the second coil 520 may be positioned to be close to a side where the wireless power reception device 200 is to be placed. Therefore, the second coil 520 can increase the magnetic flux density of the magnetic field generated in the first coil 510 toward a position close to the wireless power reception device 200.

In addition, the second coil 520 may be disposed on another surface facing the one surface where the first metal member 530 is disposed. That is, as illustrated in FIG. 5, the second coil 520 and the first metal member 530 may be disposed on the opposite surfaces to each other with respect to the first coil 510.

Meanwhile, the second coil 520 in the present invention is not an essential component, and may be omitted because it is a component for improving power efficiency.

The second metal member 540 may be formed to enclose the first coil 510, the second coil 520, and the first metal member 530. FIG. 5 exemplarily illustrates that 540a denotes one surface of the second metal member 540 and 540b denotes another surface thereof in a separate manner, but the two surfaces should be understood as one integrally-formed surface.

Similar to the first metal member 530, the second metal member 540 may prevent the magnetic field generated in the first coil 510 and the magnetic field generated in the second coil 520 from being emitted (or discharged) to outside, and simultaneously concentrating the emission-prevented magnetic field. For this purpose, the second metal member 540 may be made of a metallic material, for example, a ferrite material, a polymer material, a nano-crystal material, or the like, which prevents the magnetic field from being emitted or discharged.

At least one surface of the second metal member 540 may form an opening area so that the second coil 530 is exposed through the opening area. The opening area may serve to discharge the concentrated magnetic field in the second metal member 540 therethrough. Accordingly, the wireless power transmission device 100 according to the present invention can emit (discharge) a magnetic field having high magnetic flux density through the opening area. Also, since the opening area is formed at a position through which the second coil 530 can be exposed, the opening area, similar to the second coil 530, may be formed at a position adjacent to a position where the wireless power reception device 200 is to be disposed.

The opening area may have a size proportional to a size of the first coil 510. For example, when the size of the first coil 510 increases, the second metal member 540 may be designed so that the size of the opening area also increases.

On the other hand, the second metal member 540 according to the present invention is not an essential component, and may be omitted if necessary.

Figure 6A:
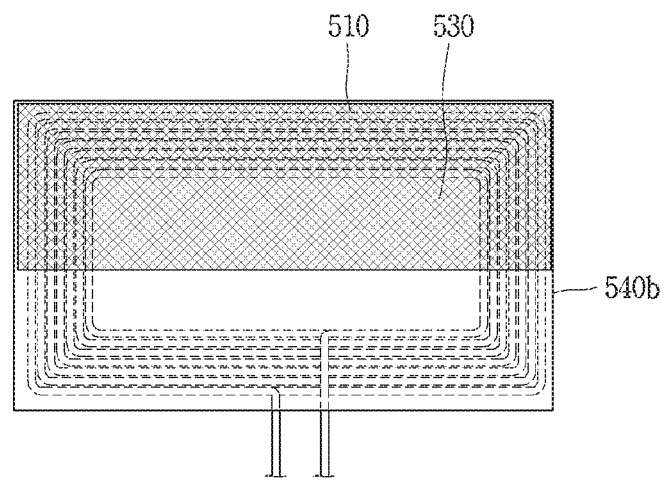
Figure 6B:
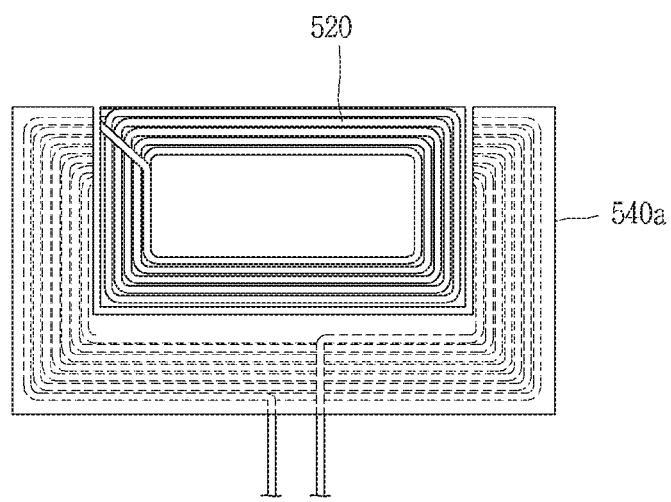

FIG. 6A is a view of one surface of the power conversion unit of FIG. 5, and FIG. 6B is a view of another surface of the power conversion unit of FIG. 5.

As illustrated in FIG. 6A, one surface 540b of the power conversion unit 111 may be entirely covered with the second metal member 540b. The first metal member 530, the first coil 510, and the second coil 520 may be sequentially disposed in the second metal member 540b.

Also, as illustrated in FIG. 6B, another surface 540a of the power conversion unit 111 may include the opening area. The second coil 520 may be exposed through the opening area.

The foregoing description has been given of the components and structure of the power conversion unit 111 of the wireless power transmission device 100 according to the present invention. With such configuration of the present invention, the wireless power signal generated in the power conversion unit 111 can be transmitted to the wireless power reception device 200 located at the side of (or adjacent to) the wireless power transmission device 100. Therefore, the present invention can have an advantage that the wireless power transmission device 100 does not need to secure an area required for mounting the wireless power reception device 200.

Figure 7:
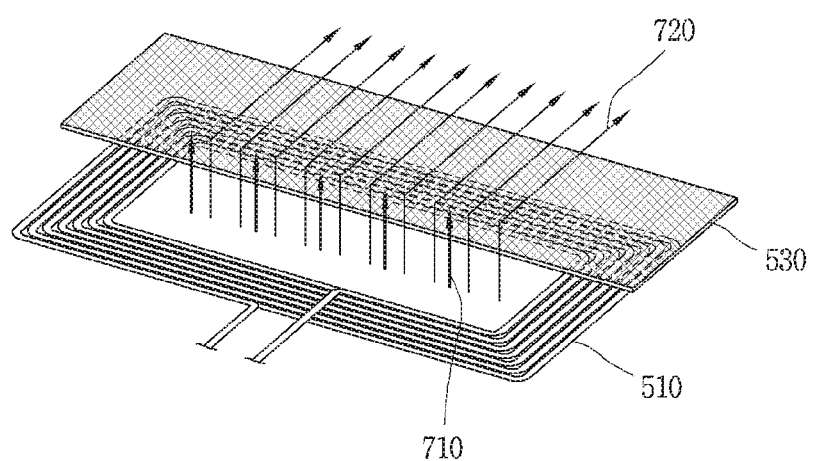
FIGS. 7 to 8 are conceptual views illustrating an emission direction of a magnetic field emitted from a power conversion unit.
Figure 8:
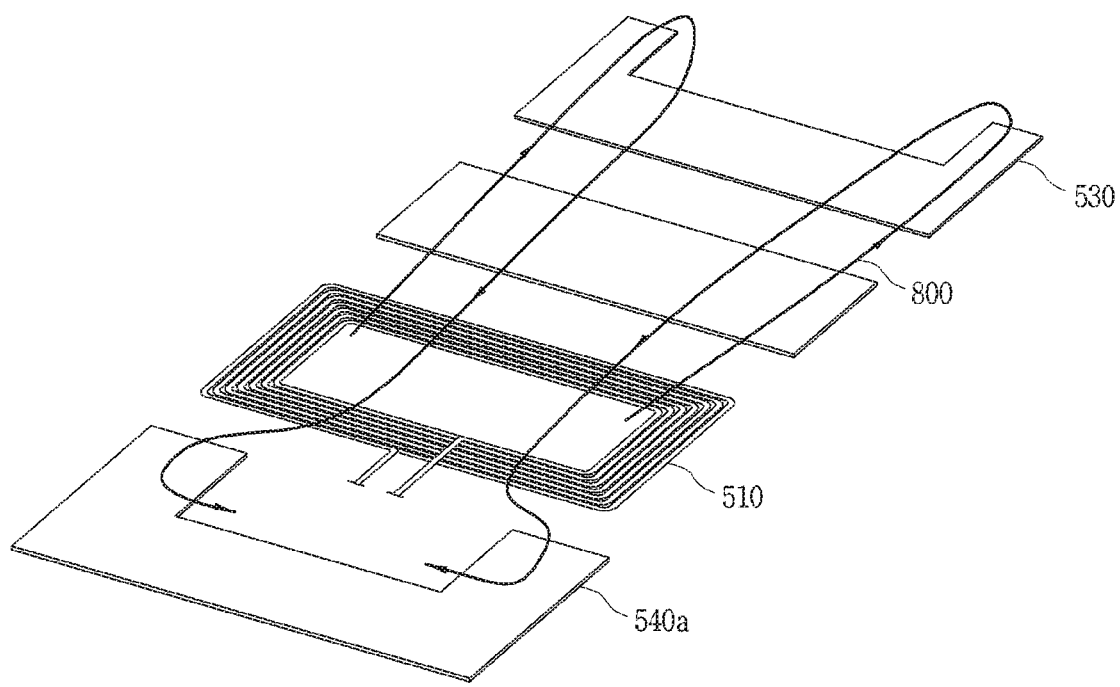

Hereinafter, the emission or discharge direction of the magnetic field generated in the power conversion unit described with reference to FIGS. 5 to 6B will be described in detail. FIGS. 7 to 8 are conceptual views illustrating an emission direction of a magnetic field emitted from a power conversion unit.

The power conversion unit 111 of the wireless power transmission device 100 according to the present invention can emit a magnetic field to a side of a charging pad 103, other than an upper side of the charging pad 103.

First, description will be given of a state in which an emission direction of a magnetic field emitted from the first coil 510 is changed.

A magnetic field emitted from the first coil 510 can be changed in emission direction as the first coil 510 overlaps the first metal member 530. That is, referring to FIG. 7, a magnetic field which is emitted from an area where the first coil 510 and the first metal member 530 do not overlap each other may be emitted in a first direction 710 which is perpendicular to the first coil 510. On the other hand, as illustrated in FIG. 7, a magnetic field emitted from an overlapped area between the first coil 510 and the first metal member 530 may be emitted in a second direction horizontal to the first coil 510 other than the first direction 710 perpendicular to the first coil 510. That is, the first metal member 530 can allow the emission direction of the magnetic field emitted in the first direction to be changed to the second direction. Accordingly, the present invention can transmit power to the wireless power reception device 200 located at the side, other than on the front surface, of the wireless power transmission device 100. Also, as the emission direction of the magnetic field is changed to the side rather than the front, the active area of the wireless power transmission device 100 can also be changed from the front to the side.

Next, referring to FIG. 8, the magnetic field emitted in the second direction may pass through the second metal member 540 and may be emitted to outside through the opening area of the second metal member 540. That is, the magnetic field may be emitted to the outside along arrows 800 in FIG. 8. Accordingly, since the concentrated magnetic field is emitted in the opening area, the magnetic field emitted can have high magnetic flux density, which may result in transmitting the magnetic field to the side (lateral direction) and also enhancing power efficiency of power transmitted through the magnetic field. Also, since the concentrated magnetic field is emitted in the present invention, a wireless power signal which is generated by a magnetic field can be emitted farther, thereby improving a recognition distance.

The emission direction of the magnetic field generated in the first coil 510 has been described above. Accordingly, the present invention can supply electric power to the wireless power reception device 200 located at the side (lateral direction) of the wireless power transmission device 100 by allowing the magnetic field having high magnetic flux density to be emitted in a desired direction.

Figure 9A:
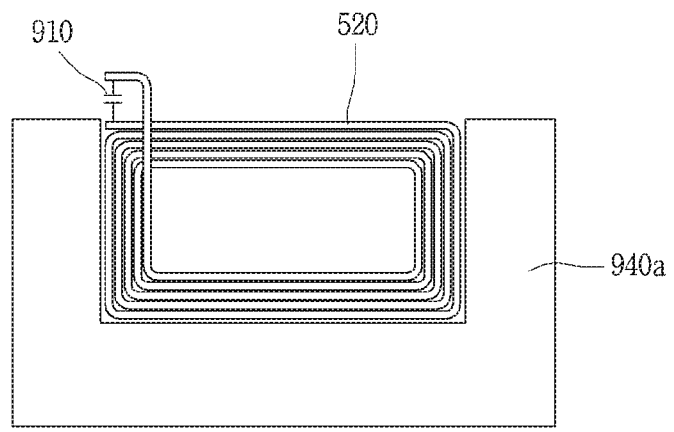
FIGS. 9A and 9B are conceptual views illustrating different structures for transmitting power having a high frequency in a mobile terminal according to the present invention.
Figure 9B:
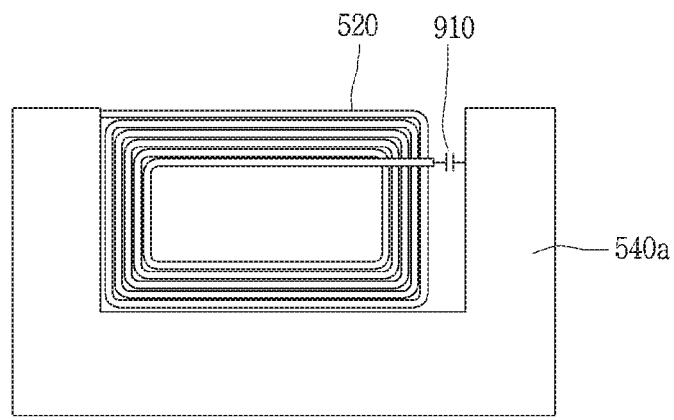

Hereinafter, a coil structure for transmitting power having a harmonic frequency in a wireless power transmission device according to the present invention will be described. FIGS. 9A and 9B are conceptual views illustrating different structures for transmitting power having a harmonic frequency in a mobile terminal according to the present invention.

The wireless power transmission device 100 according to the present invention can transmit power having a harmonic frequency, which corresponds to an integral multiple of a fundamental frequency, to the wireless power reception device 200 during wireless charging, in order to improve power efficiency and recognition distance.

For this, the power conversion unit 111 may further include a second coil 520 for generating a magnetic field of a harmonic frequency, as well as a first coil 510 and a first metal member.

The second coil 520 may have a specific inductance value for frequency matching with a harmonic frequency of the wireless power reception device 200. In addition, the second coil 520, as illustrated in FIG. 9A, may be wound in a rectangular shape having a hollow portion. However, the shape of the second coil 520 is not limited thereto, and may be modified into various shapes as long as it has a specific inductance value.

The second coil 520 may be located in the opening area of the second metal member 540 so that the magnetic field generated in the second coil 520 is emitted. Therefore, the magnetic field generated in the second coil 520 can be emitted to outside by the second metal member 540.

Meanwhile, the second coil 520 may be electrically connected or may not connected to the second metal member 540. For example, as illustrated in FIG. 9A, the second coil 520 may not be connected to the second metal member 540. In this case, the wireless power transmission device 100 can perform frequency matching with the wireless power reception device 200 based on inductance of the second coil 520.

As another example, as illustrated in FIG. 9B, the second coil 520 may be electrically connected to the second metal member 540. In this case, the wireless power transmission device 100 may perform frequency matching with the wireless power reception device 200 based on combined inductance obtained by combining inductance of the second coil 520 and inductance of the second metal member 540. That is, the wireless power transmission device 100 can utilize the second metal member 540 as secondary inductance, thereby increasing only the inductance value without increasing resistance. Thus, the wireless power transmission device 100 can improve power efficiency.

The power conversion unit 111 may further include a capacitor having a specific capacitance for frequency matching with the harmonic frequency of the wireless power reception device 200. The capacitor may be electrically connected to the second coil 520. For example, as illustrated in FIG. 9A, a capacitor 910 may be electrically connected to both ends of the second coil 520, or may be electrically connected between the second coil 520 and the second metal member 540.

In the above description, the method of transmitting the wireless power signal having the harmonic frequency to the wireless power reception device through the frequency matching has been described. With such configuration, the wireless power transmission device 100 can improve power efficiency and recognition distance.

Figure 10:
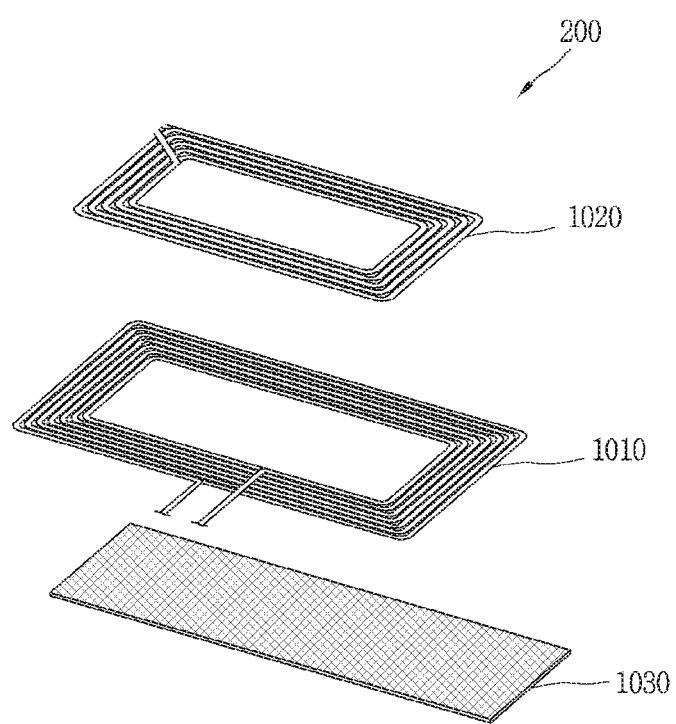
FIG. 10 is a conceptual view illustrating a coil structure of a power receiving unit of a wireless power reception device according to the present invention.

Hereinafter, a configuration of the power receiving unit 291 of the wireless power reception device according to the present invention will be described. FIG. 10 is a conceptual view illustrating a coil structure of a power receiving unit of a wireless power reception device according to the present invention.

Referring to FIG. 10, the power receiving unit 291 of the wireless power reception device 200 according to the present invention may include at least one of a first coil 1010, a second coil 1020, and a metal member 1030, in order to receive power from the wireless power transmission device 100.

The first coil 1010 may serve to receive a wireless power signal generated in the first coil 510 of the wireless power transmission device 100. That is, the first coil 510 may receive a magnetic field having a fundamental frequency of the wireless power reception device 200.

Also, the first coil 1010 may be wound in a rectangular shape and form a hollow area. At this time, the first coil 1010 is not limited to the shape, but may be wound in various shapes having a hollow area, for example, a donut shape, a triangle, or the like. The shape of the first coil 1010 may be easily changed by design of a designer.

The second coil 1020 may be disposed on one surface of the first coil 510 in an overlapping manner. In addition, the second coil 1020 may be configured to receive a magnetic field having a harmonic frequency generated from the wireless power transmission device 100.

Inductance of the second coil 1020 may be decided by a combined value obtained by combining inductance of the second coil 520 and inductance of the second metal member of the wireless power transmission device 100. That is, the second coil 1020 may have an inductance value that matches the frequency of the wireless power transmission device 100.

The metal member 1030 may be disposed on another surface facing the one surface of the first coil 510. In addition, the metal member 1030 may be disposed to be close to a position adjacent to a position where the wireless power transmission device 100 is to be placed. Accordingly, the wireless power reception device 200 can concentrate a magnetic field received at the position adjacent to the wireless power transmission device 100.

The metal member 1030 may concentrate the magnetic field received from the first coil 510 to prevent the magnetic field from being externally emitted. For this, the metal member 1030 may be formed to cover at least half the area of the first coil 510.

The components and the structure of the power receiving unit of the wireless power reception device 200 according to the present invention have been described above.

Figure 11:
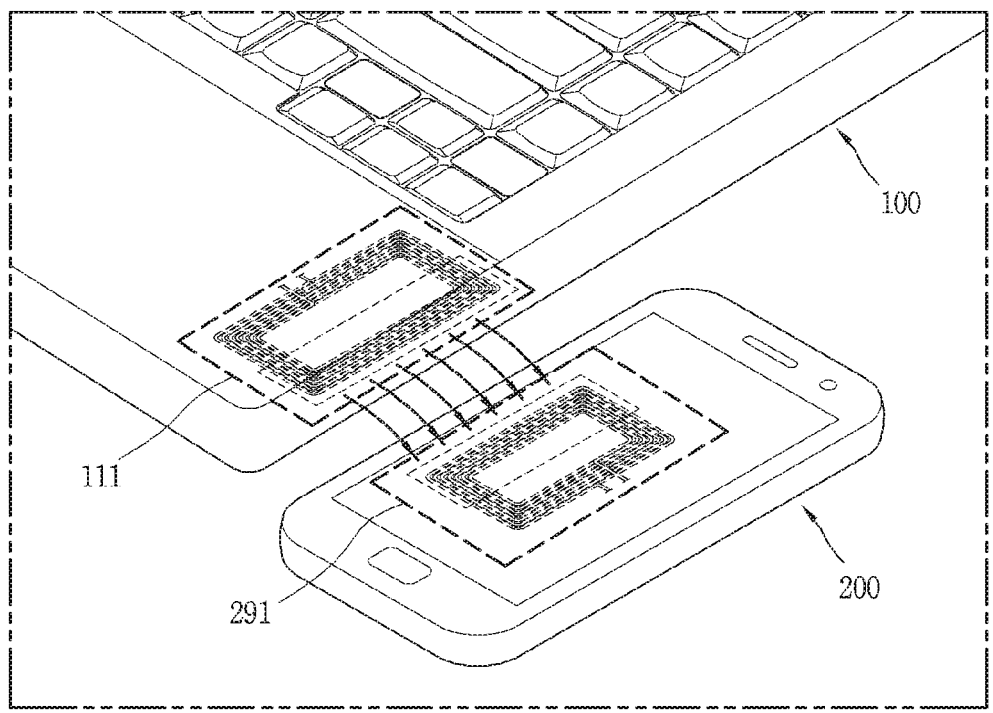
FIG. 11 is a conceptual view illustrating a state in which power is transmitted wirelessly from a wireless power transmission device 100 having the aforementioned structure to a wireless power reception device 200.

FIG. 11 is a conceptual view illustrating a state in which power is transmitted wirelessly from the wireless power transmission device 100 to the wireless power reception device 200, each having the aforementioned structures.

The wireless power transmission device 100 according to the present invention may be an electronic device, such as a notebook computer, a smart phone, and the like, which include the structure of the power conversion unit 111. The wireless power transmission device 100 may not include a charging pad for placing the wireless power reception device 200 thereon, unlike the related art wireless power transmission device. Accordingly, the wireless power transmission device 100 may be configured to transmit power wireless by inserting only a coil included in the power conversion unit 111 into an existing electronic device. For example, as illustrated in FIG. 11, the coil of the power conversion unit 111 may be inserted into one area of a notebook computer so as to be used as the wireless power transmission device 100.

In addition, the wireless power reception device 200 according to the present invention may include the power receiving unit 291 to receive power from a side of the wireless power transmission device 100. That is, the wireless power reception device 200 may be located at a side adjacent to the wireless power transmission device 100. Accordingly, the present invention proposes a structure capable of performing wireless charging without a separate charging pad of the wireless power transmission device 100.

According to a transmission device of the present invention as described above, a direction of a magnetic field emitted from a coil is changed from a direction perpendicular to the coil into a horizontal direction using a metallic shielding material, thereby supplying power to a reception device located at a side of the transmission device. Therefore, a user can perform charging wirelessly even if the transmission device and the receiving device are not perpendicularly stacked with each other.

Further, according to a transmission device of the present invention, power efficiency can be improved through a first coil that emits a magnetic field having a fundamental frequency and a second coil that emits a magnetic field having a harmonic frequency of the fundamental frequency.

Further, according to a transmission device of the present invention, a magnetic field can be concentrated and emitted by use of a metal member, thereby increasing a recognition distance of wireless charging.

It will be easily understood by those skilled in the art that the configuration of the wireless power transmission device according to those embodiments disclosed herein can be applied to devices such as a docking station, a cradle device, and other electronic devices, unless otherwise limited to a case of being applicable only to wireless chargers.

The scope of the present invention is not limited to the embodiments disclosed in this specification, and the present invention can be modified, changed, or improved in various forms within the scope of the present invention and the claims.

The invention claimed is:

1. A wireless power transmission device comprising:
a first coil configured to convert current into a magnetic field that is emitted in a first direction; and
a first metal member formed to cover at least a portion of the first coil, wherein the first metal member is positioned to cause a change in direction of the magnetic field from the first direction to a second direction to provide power to a wireless power receiving device located adjacent to a side of the wireless power transmission device.

2. The transmission device of claim 1, wherein the first direction of the magnetic field is perpendicular to one side of the first coil and the second direction is parallel to the one side.

3. The transmission device of claim 1, wherein the first metal member is formed to cover at least half of one side of the first coil.

4. The transmission device of claim 1, wherein the first direction is perpendicular to the second direction.

5. The transmission device of claim 1, further comprising:
a second metal member shaped to define a space within which the first coil and the first metal member are located, wherein the second metal member comprises metal that prevents emission of the magnetic field.

6. The transmission device of claim 5, wherein the second metal member is shaped to define an opening such that at least part of a surface of the first coil, facing one surface of the first coil covered by the first metal member, is exposed through the opening.

7. The transmission device of claim 6, further comprising a second coil positioned to overlap a portion of the first coil that is exposed through the opening.

8. The transmission device of claim 7, wherein the second coil is positioned to be exposed through the opening.

9. The transmission device of claim 7, wherein the second coil is electrically connected to a capacitor to match a harmonic frequency of a fundamental frequency.

10. The transmission device of claim 7, wherein the second coil has one side electrically connected to the second metal member and another side connected to the second metal member to match a harmonic frequency of a fundamental frequency.

11. A wireless power transmission device comprising:
a housing having a first side and a second side adjacent to the first side;
a first coil located within the housing and configured to convert current into a magnetic field that is emitted in a first direction, wherein the first direction is perpendicular to a plane of the first side;
a first metal member located within the housing and formed to cover at least a portion of the first coil,
wherein the first metal member is positioned to cause a change in direction of the magnetic field from the first direction to a second direction to provide power to a wireless power receiving device located adjacent to the second side of the wireless power transmission device, and
wherein the second direction is perpendicular to a plane of the second side.

12. A wireless power transmission device comprising:
a housing;
a first coil located within the housing and configured to convert current into a magnetic field that is emitted in a first direction;
a first metal member located within the housing and formed to cover at least a portion of the first coil,
wherein the first metal member is positioned to cause a change in direction of the magnetic field from the first direction to a second direction to provide power to a wireless power receiving device located adjacent to a side of the housing of the wireless power transmission device, and
wherein the first direction is perpendicular to the second direction.

* * * * *